United States Patent [19]

Lundberg

[11] Patent Number: 5,037,156
[45] Date of Patent: Aug. 6, 1991

[54] WINDSHIELD PROTECTOR

[76] Inventor: Frances A. Lundberg, 8956 Eisenhower Rd., Tucson, Ariz. 85706

[21] Appl. No.: 364,255

[22] Filed: Jun. 8, 1989

Related U.S. Application Data

[63] Continuation of Ser. No. 185,492, Apr. 25, 1988, abandoned.

[51] Int. Cl.[5] .................................................. B60J 11/00
[52] U.S. Cl. ................................ 296/95.1; 160/370.2; 150/168
[58] Field of Search ............... 296/97.7, 95.1, 136; 160/370.2; 150/166, 168

[56] References Cited

U.S. PATENT DOCUMENTS

| 304,604 | 9/1984 | Bradley | 296/136 |
|---|---|---|---|
| 1,528,712 | 3/1925 | Ward | 150/166 X |
| 1,728,437 | 9/1929 | Mott | 296/136 X |
| 2,341,236 | 2/1944 | Parkins | 296/95.1 |
| 2,437,845 | 3/1948 | Wyeth | 296/95.1 X |
| 2,599,066 | 6/1952 | Osborn | 160/370.2 |
| 2,620,007 | 12/1952 | Keller | 150/166 |
| 4,799,728 | 1/1989 | Akers et al. | 296/95.1 X |

FOREIGN PATENT DOCUMENTS

| 2457185 | 6/1976 | Fed. Rep. of Germany | 296/95.1 |
|---|---|---|---|
| 2537511 | 6/1984 | France | 296/95.1 |

OTHER PUBLICATIONS

Translation of French Patent Application No. 2,537,511.

Primary Examiner—Dennis H. Pedder
Attorney, Agent, or Firm—Mark E. Ogram

[57] ABSTRACT

A device for the protection of a vehicle's windshield from heat, frost, rain, snow, and the like. The protector is preferably a layer of polyethylene which covers the outside of the windshield. The cover is held in place by two wings which are secured between the vehicle's doors and their frames. Placement of these wings within the door is facilitated through the use of handles or cords which attach to the wing and are long enough to permit the operator to keep their hand from the doorway during closure of the vehicle's door.

6 Claims, 1 Drawing Sheet

WINDSHIELD PROTECTOR

BACKGROUND

This is a continuation of U.S. patent application number 185,492, filed Apr. 25, 1988, and entitled "Windshield Protector", abandoned.

This invention relates generally to protectors for vehicles and more specifically to windshield protectors.

Because of the critical nature of the windshield, its protection from the elements when the vehicle is not in use has been a problem. Excessive exposure to sunlight causes the vehicle to overheat and can cause damage to the material in the interior. Snow, ice, and dew collect on the windshield and can dramatically decrease operator vision requiring an excessive amount of work in removing it.

One critical problem which all screens must address is their own security. The vehicle itself is usually equipped with locks and the like. Without a method of securing a windshield protector, the protectors are easily stolen which eliminates their effectiveness and commercial viability.

One approach to the problem was described by U.S. Pat. No. 4,202,396, issued to Levy on May 13, 1980, and entitled "Motor Vehicles and Sunshields". In this approach, a collapsing cardboard type of screen is used on the interior of the vehicle. Although this approach does protect the cars interior from direct sunlight, it does not address the problem of excessive heating or of exterior protection. The heat from the sunlight is merely caught between the cardboard screen and the windshield providing an oven approach which is released when the operator removes the screen. No protection is given for snow or ice collecting on the windshield.

Several other methods have been developed to provide exterior protection to the windshield. These include U.S. Pat. No. 2,359,496, issued Oct. 3, 1944, to Taylor entitled "Frost Shield"; U.S. Pat. No. 3,588,169, to Lunt, entitled "Windshield Protector"; and, U.S. Pat. No. 4,597,608, to Duffy, entitled "Automobile Windshield Cover".

All of these devices attempt to solve the ice problem with an exterior cover. Each though requires some physical modification to be done to the vehicle so that the shield can be fastened to the vehicle. Unfortunately, these fasteners are not attractive to the vehicle owner and disrupt the vehicle's lines. Additionally, although the screen/cover is fastened to the vehicle, the fasteners are available to any passerby who could readily disengage the screen/cover and steal it.

Other approaches have been taken to fasten the screen/cover to the vehicle without the requirement of modifying the vehicle. These include the use of ropes or the like to "tie" or fasten the covering to the vehicle by way of the door handles or other natural points on the vehicle.

Included in this group is U.S. Pat. No. 2,223,145, issued Nov. 26, 1940, to Wise and entitled "Windshield Cover"; U.S. Pat. No. 2,437,845, issued Mar. 16, 1948, to Wyeth and entitled "Windshield Cover"; U.S. Pat. No. 3,874,437, issued Apr. 1, 1975, to Black and entitled "Windshield Cover".

In all of these situations, the device is tied to an exterior part of the car making it extremely easy to steal the covering.

To eliminate the need for tying and make it easier for the operator to apply the covering, many devices have been developed which use some adhesive type of device such as magnets or suction cups.

Included in this group are: U.S. Pat. No. 3,410,601, issued Nov. 12, 1968, to Thompson for "Windshield Protective Device"; U.S. Pat. No. 1,473,029, issued Nov. 6, 1923, to Faubert et al. for "Clear Vision Device"; U.S. Pat. No. 3,964,780, issued June 22, 1976, to Naidu for "Snow Protectors for Windshields"; U.S. Pat. No. 3,184,264, issued May 18, 1965, to Ealey et al. for "Windshield Protector"; U.S. Pat. No. 3,042,111, issued July 3, 1962, to Wytovich for "Magnetic Windshield and Window Covers"; and U.S. Pat. No. 3,046,048, issued July 24, 1962, to Cheney for "Magnetically Secured Windshield Cover".

Besides being very susceptible to theft, many of these devices can damage the vehicle during removal. In the case of magnetic adhesion, when the magnet is drawn across the paint, a small amount of sand between the magnet and the paint can scratch the paint. This, together with the lack of security for the device makes it unappealing to the user.

In order to solve the security factor, some devices have attempted to fasten the cover into the vehicle. This is usually done by having a flap or wing of the material fit between the vehicle's door and its frame. When the material is closed therein, a thief would have to unlock the door to remove the screen without destroying the screen.

This arrangement is described by U.S. Pat. No. 2,851,303, issued Sept. 9, 1958, to McQueen for "Windshield Protector". In this device, the screen is contained upon a roller which is attached to the steering wheel and enclosed within the vehicle. A similar approach was described in U.S. Pat. No. 4,635,993, issued Jan. 13, 1987, to Hooper et al. for "Automobile Windshield Cover". This device had two wings with padded ends which could be placed within the vehicle to attach the screen/cover to the vehicle.

The problem with both the McQueen and Hooper et al. approach is that during application of the cover, it is physically impossible to obtain a secure fit across the windshield itself (the object of all the inventions). Once one end of the screen is placed in position, the other end is moved into position and the vehicle's door is opened. The operator then must hold the wing extending into the interior of the vehicle while the operator closes the vehicle's door. The closing of the door creates a rush of air that naturally flows under the windshield cover and loosens it. The operator is further distracted by the fact that the vehicle's door is closing only a fraction of an inch from their own fingers. This, besides being dangerous, is also distracting causing the operator to have less than full concentration.

Another important deficiency with all of the prior art is their choice of materials. Usually this material is a single sheet of plastic or the like which becomes brittle and stiff when subjected to the cold (as would be found in a snow screen situation). Once the screen has been used a couple of times, it has either been torn or the operator loses patience with its stiffness and either discards it or does not use it.

It is clear from the forgoing that an efficient, safe, and secure mechanism does not exist which will permit the protection of the front windshield of a vehicle.

SUMMARY OF THE INVENTION

In the present invention, a sheet of material is used to cover the windshield itself. Attached, or as part of an extension of the cover, are two wings which are susceptible to being pressed between the vehicle's door and its frame when the door is closed. A ribbon, strap, or elongated piece of material is attached to each wing for the operator to hold during the closure of the door. The strap has sufficient length to permit the operator to extend it past the rear of, or under, the door, thereby making sure that the operator's hand is in a safe position.

In the preferred embodiment of the invention, the cover is composed of a multilayer arrangement with one of the layers being polyethylene so as to create a thermal blanket against the window and yet remain flexible even when subjected to extremes in heat and cold. Another layer on the polyethylene is chosen so that it may be printed upon by the distributor to identify the product in market or to convey some saying. Preferably, both sides of the polyethylene have this same layer.

Because of the length of strap or the like, the operator can make sure that the covering remains taut during closure of the door without worry about their own safety. Since the cover is taut, the cover is less likely to incur wind damage or permit moisture to get beneath the cover and freeze upon the windshield.

In one embodiment of the invention, the wings are made extra large so that they provide a screen for the windows within the vehicle's doors. This not only provides more protection for the interior of the vehicle but it also provides for privacy should the operator of the vehicle, such as a long distance trucker, want to sleep.

The sandwich approach to the cover of the invention in the preferred embodiment also permits the cover to provide added strength without creating a material which is brittle or stiff.

In the preferred embodiment, the entire assembly is formed from a single piece of material of polyethylene. Hence, the body, wings, and straps/ handles all are formed of the same unit. This eliminates the need to perform any glueing or other attaching of the straps/ handles to the wings.

The invention together with various embodiments thereof will be more fully described by the drawings and their accompanying descriptions.

DRAWINGS IN BRIEF

DRAWINGS IN DETAIL

Figure 1:
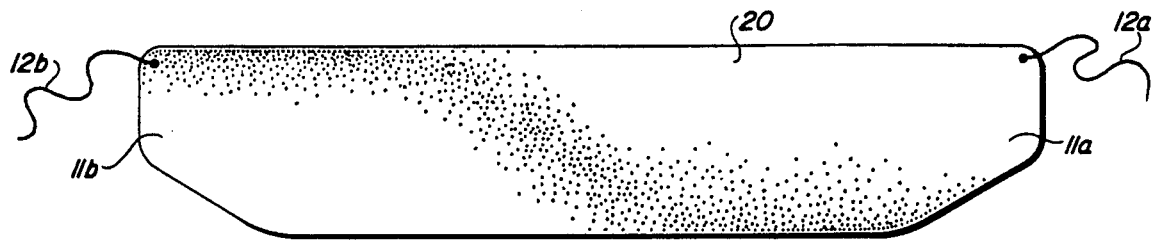
FIG. 1 is a frontal view of an embodiment of the invention.

In FIG. 1, an embodiment of the invention is illustrated. The main body 10 of the windshield protector is larger than the windshield it is to protect. This not only provides for a complete covering but reduces the availability of wind damage since the body is kept secure to the vehicle.

Wings 11a and 11b, in this embodiment, are an extension of the main body 10. Other embodiments of the invention call for the physical attachment of the wings to the main body. Wings 11a and 11b have sufficient length to permit them to be closed between the vehicle's door and the frame. The exterior edges of wings 11a and 11b may be made thicker by folds or the like to reduce the possibility of a thief slipping the wings from the door.

Straps 12a and 12b permit the operator to securely hold the respective wings 11a and 11b in place during the closure of the door. Straps 12a and 12b have an overall length so that when the door is completely closed, parts of straps 12a and 12b extend from the rear of the vehicle's door.

In one embodiment of the invention, the straps are attached to the respective wings through the use of a yoke of material. This permits the even application of force to the protector when the protector is being placed upon the vehicle.

In this manner, the protector, which can also be used for a windshield billboard in advertising manner, can be securely and safely fastened to the vehicle. Thereby eliminating the possibility of theft and of wind damage to the protector.

Figure 2:
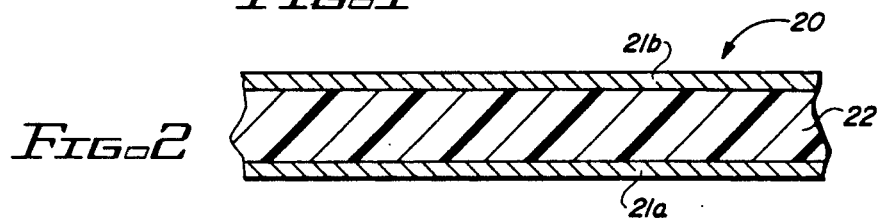
FIG. 2 is a cutaway view of an embodiment of the invention illustrating the sandwich of the cover or body of the windshield protector.

FIG. 2 highlights the preferred embodiment's sandwich approach to the protector. The protector 20 is composed of an interior layer 22 of polyethylene which provides flexibility and durability even during extremes in temperature. Attached to either side of interior layer 22 are layers of material which permanently accept ink. This permits the printing of slogans and other commercial messages, as well as messages of help, onto the windshield protector. With this capability, the protector becomes a windshield billboard and becomes less expensive since commercial businesses will subsidize their distribution.

Figure 3:
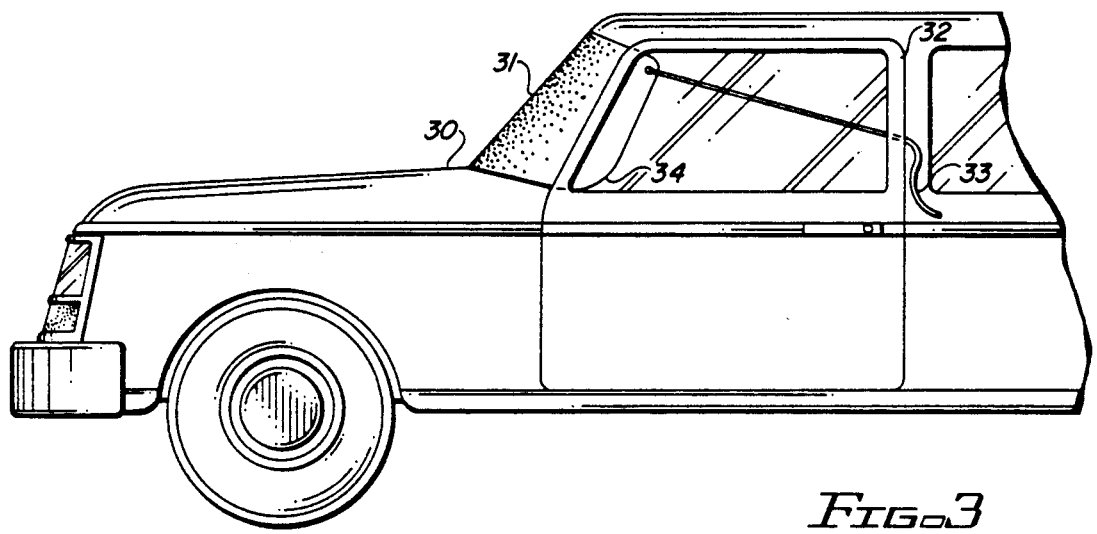
FIG. 3 illustrates an embodiment of the invention as it is attached to a vehicle.

FIG. 3 illustrates an embodiment of the invention after it has been attached to a vehicle 30. Beneath the screen/ protector 31 lies the vehicle's 30 windshield. Door 32 pinches the wing 34 between the door and the frame to prevent the unauthorized removal of the windshield protector.

To further secure the windshield protector, the vehicle's windshield wipers can be used to secure the protector by placing the protector under them.

Handle or strap 33 extends past the rear portion of door 32 permitting the operator to keep the screen 31 snug during the closure of door 32. The strap 33 is sufficiently long so that it extends well past the door. In this embodiment, the length is at least six (6) inches to provide for sufficient safety.

Figure 4:
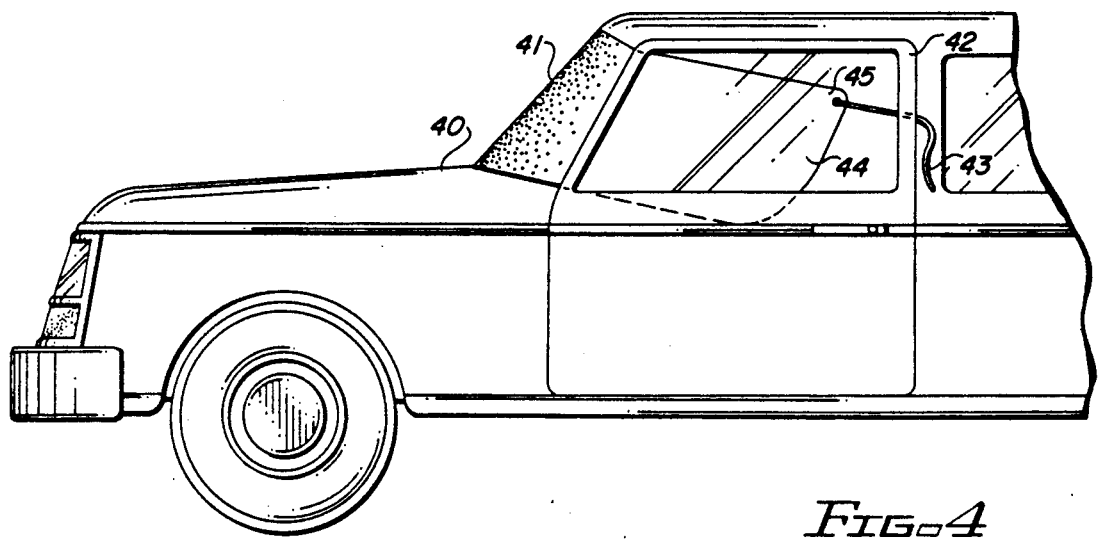
FIG. 4 illustrates an embodiment of the invention as it is attached to a vehicle wherein the side windows are provided some protection through the use of the extended wings.

FIG. 4 illustrates another embodiment of windshield protector after it has been applied to vehicle 40. Again the protector portion 41 covers the windshield of vehicle 40. Wing 44 extends into the vehicle and is pinched between door 42 and its frame. In this embodiment, the length of the wing 44 is extended so that it covers at least some of side window 45.

This provides added protection to the interior of the car from sun damage and also gives any resting operator some additional privacy.

It is clear from the forgoing that this invention provides a significant improvement over the prior art in its generation of a windshield screen/ protector which is secure from theft, resistant to wind damage; safe for the operator to apply, does not damage the vehicle it is to protect, pliable even in extreme temperatures, and yet inexpensive to construct.

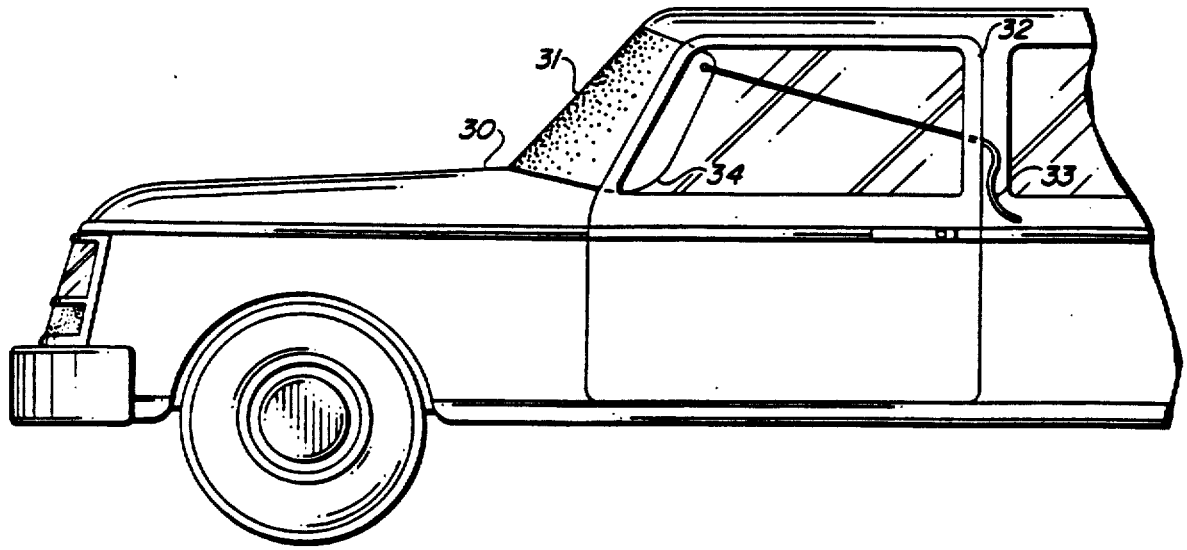

What is claimed is:

1. A method of securing a protective device having a main body and two wings to a windshield of a vehicle having two doors, the method comprising:
   (A) opening a first door of said vehicle;
   (B) placing a first wing of said protective device in a first door frame;
   (C) maintaining the first wing in the vicinity of the first door frame through the use of a first strap attached to said first wing, said first strap ending in an end portion adapted for manual grasping, said first strap having sufficient length to extend past a back of the first door frame;
   (D) closing the first door, thereby clasping the first wing between the first door and the first door frame and leaving the end portion of said first strap hanging free on the exterior of said vehicle;
   (E) opening a second door of said vehicle;
   (F) placing a second wing of said protective device in the vicinity of a second door frame;
   (G) stretching the main body of said protective device over said windshield by applying a pulling force on said second wing while maintaining the second wing in the vicinity of the second door frame through the use of a second strap attached to said second wing, said second strap ending in an end portion adapted for manual grasping, said second strap having sufficient length to extend past a back of the second door frame; and,
   (H) closing the second door, thereby clasping the second wing between the second door and the second door frame and leaving the end portion of said second strap hanging free on the exterior of said vehicle.

2. The method of securing a protective device according to claim 1 further comprising the step of securing a base of said main body using at least one windshield wiper of said vehicle.

3. A combination comprising:
   (A) a vehicle having at least two doors with respective door frames, an interior, and a windshield; and,
   (B) a protective device secured to said vehicle and having,
      (1) a single sheet of flexible material being wider than the windshield of said vehicle, edges of said sheet clamped between respective ones of said door and said door frame and terminating within said vehicle interior,
      (2) a first strap of material having two ends, the first end of said first strap attached to a first one of said edges of said single sheet of flexible material, the second end of said first strap being adapted for manual grasping, and wherein said second end is clamped between respective ones of said door and said door frame and hangs freely on the exterior of said vehicle, and,
      (3) a second strap of material having two ends, the first end of said second strap attached to a second edge of said single sheet of flexible material, the second end of said second strap adapted for manual grasping and wherein said second end is clamped between respective ones of said door and said door frame and hangs freely on the exterior of said vehicle.

4. The combination according to claim 3 wherein said single sheet of flexible material contains polyethylene foam.

5. The combination according to claim 3 wherein said single sheet of flexible material has at least two layers therein.

6. The combination according to claim 5 wherein said single sheet of flexible material is a three layer sandwich arrangement and wherein one of said layers is composed of a polyethelene foam.

* * * * *

UNITED STATES PATENT AND TRADEMARK OFFICE
CERTIFICATE OF CORRECTION

PATENT NO. : 5,037,156

DATED : August 6, 1991

INVENTOR(S) : Frances A. Wilbur Lundberg

It is certified that error appears in the above-identified patent and that said Letters Patent is hereby corrected as shown below:

Title page should be deleted to appear as per attached title page:

Signed and Sealed this

First Day of December, 1992

Attest:

DOUGLAS B. COMER

Attesting Officer

Acting Commissioner of Patents and Trademarks

United States Patent [19]

Lundberg

[11] Patent Number: 5,037,156
[45] Date of Patent: Aug. 6, 1991

[54] WINDSHIELD PROTECTOR

[76] Inventor: Frances A. Wilbur Lundberg, 8956 Eisenhower Rd., Tucson, Ariz. 85706

[21] Appl. No.: 364,255

[22] Filed: Jun. 8, 1989

Related U.S. Application Data

[63] Continuation of Ser. No. 185,492, Apr. 25, 1988, abandoned.

[51] Int. Cl.⁵ .............................................. B60J 11/00
[52] U.S. Cl. ................................. 296/95.1; 160/370.2; 150/168
[58] Field of Search ............. 296/97.7, 95.1, 136; 160/370.2; 150/166, 168

[56] References Cited

U.S. PATENT DOCUMENTS

| | | | |
|---|---|---|---|
| 304,604 | 9/1984 | Bradley | 296/136 |
| 1,528,712 | 3/1925 | Ward | 150/166 X |
| 1,728,437 | 9/1929 | Mott | 296/136 X |
| 2,341,236 | 2/1944 | Parkins | 296/95.1 |
| 2,437,845 | 3/1948 | Wyeth | 296/95.1 X |
| 2,599,066 | 6/1952 | Osborn | 160/370.2 |
| 2,620,007 | 12/1952 | Keller | 150/166 |
| 4,799,728 | 1/1989 | Akers et al. | 296/95.1 X |

FOREIGN PATENT DOCUMENTS

| | | | |
|---|---|---|---|
| 2457185 | 6/1976 | Fed. Rep. of Germany | 296/95.1 |
| 2537511 | 6/1984 | France | 296/95.1 |

OTHER PUBLICATIONS

Translation of French Patent Application No. 2,537,511.

Primary Examiner—Dennis H. Pedder
Attorney, Agent, or Firm—Mark E. Ogram

[57] ABSTRACT

A device for the protection of a vehicle's windshield from heat, frost, rain, snow, and the like. The protector is preferably a layer of polyethylene which covers the outside of the windshield. The cover is held in place by two wings which are secured between the vehicle's doors and their frames. Placement of these wings within the door is facilitated through the use of handles or cords which attach to the wing and are long enough to permit the operator to keep their hand from the doorway during closure of the vehicle's door.

6 Claims, 1 Drawing Sheet